No. 729,283.

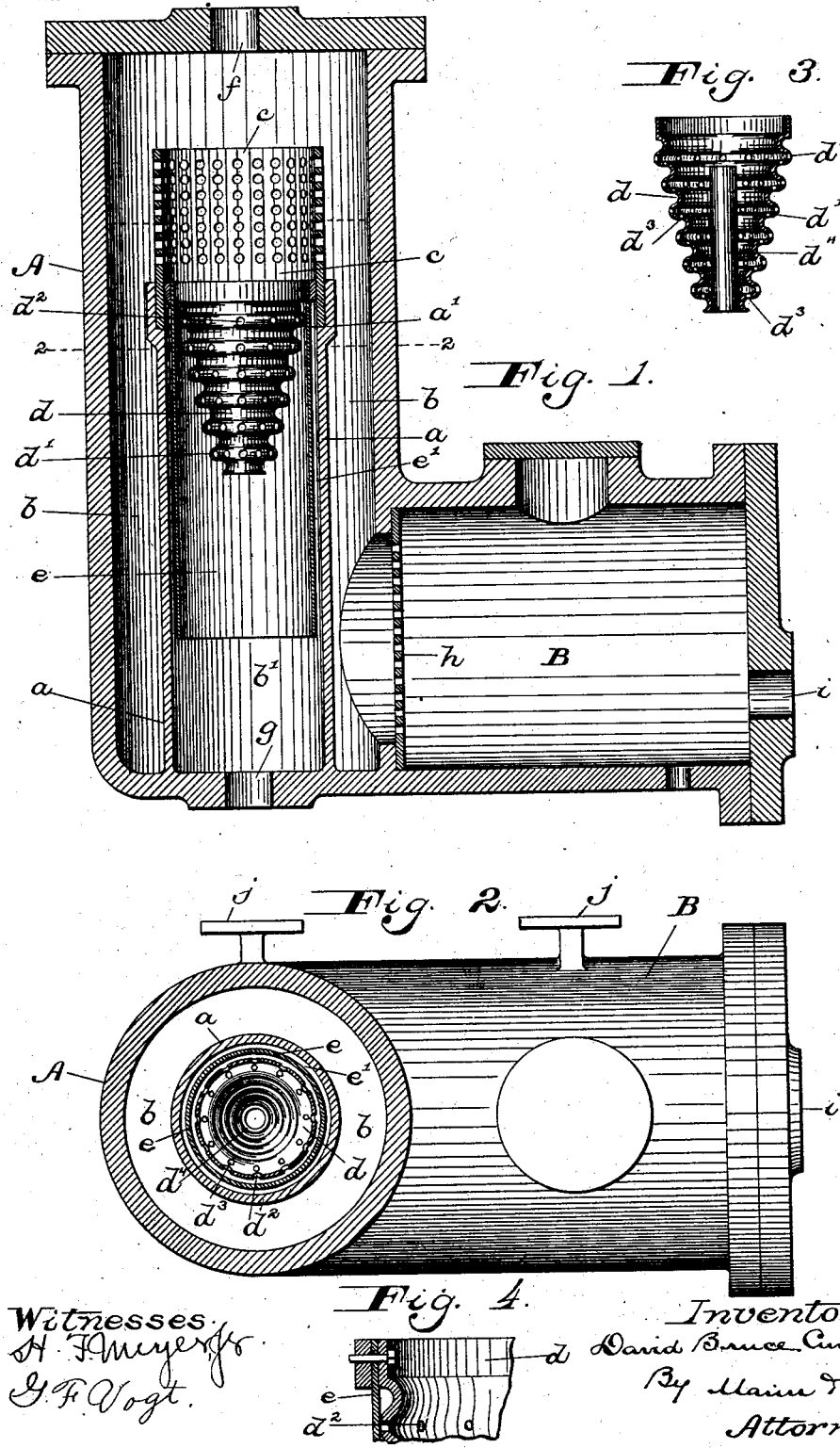

Patented May 26, 1903.

UNITED STATES PATENT OFFICE.

DAVID BRUCE CUMMING, OF BALTIMORE, MARYLAND.

FEED-WATER HEATER.

SPECIFICATION forming part of Letters Patent No. 729,283, dated May 26, 1903.

Application filed February 18, 1903. Serial No. 143,889. (No model.)

*To all whom it may concern:*

Be it known that I, DAVID BRUCE CUMMING, a subject of the King of Great Britain, residing at Baltimore, State of Maryland, have invented certain new and useful Improvements in Feed-Water Heaters, of which the following is a specification.

This invention relates to improvements in that class of liquid or feed-water heaters in which steam is commingled with the liquid or feed-water.

The object of the invention is to provide an improved device of this character in which the steam will act on the liquid or feed-water effectively to raise every drop or particle thereof to a high temperature and in a very expeditious manner.

The invention consists of certain constructions, arrangements, and combinations of parts hereinafter fully described and claimed, reference being had to the accompanying drawings, in which—

Figure 1 is a vertical longitudinal sectional view of the improvement. Fig. 2 is a longitudinal sectional view taken on the line 2 2 of Fig. 1. Fig. 3 is a detail sectional view of the water-retarder, and Fig. 4 is a detail sectional view of a portion of the retarder and the adjoining parts.

Referring to the drawings, the letter A designates an exterior shell or vessel, which in the present instance is cylindrical and adapted to be secured in a vertical position. A casing $a$ has position with the shell A, and the walls of said casing, together with the surrounding walls of the vessel, form an annular water-chamber $b$, and the interior of said casing forms a commingling-chamber $b'$. The said inner casing $a$ is provided near its upper open end with an interior shoulder $a'$, in which is fitted a foraminous cylindrical shell $c$, open at its top and bottom and extending above the upper edge of the said casing $a$, and secured by any suitable means within the said cylinder and at the bottom of said shell is a funnel-shaped water-retarder $d$, provided with corrugated side walls $d'$, having perforations $d^2$ and $d^3$ at the sides and bottoms of the corrugations, as illustrated in the drawings.

A central tube $d^4$ has position within the funnel-shape retarder and closes the lower end of said retarder, and thereby insures that the liquid will be checked in its passage through the retarder and prevents the escape of liquid except through the perforations $d^2$ and $d^3$, while the steam will pass freely through said tube into the commingling-chamber $b'$.

A cylinder $e$ has position within the casing $a$ and extends from the funnel-shape retarder toward the bottom of said casing. This cylinder is smaller in diameter than the casing $a$ and when in position forms an insulating space $e'$ between said cylinder and casing. The advantage in this construction will be hereinafter pointed out.

At the top of the casing A is formed a steam-inlet opening $f$, and at the bottom of the casing and within the walls of the commingling-chamber $b'$ is formed a discharge-opening $g$, adapted to lead (by a pipe or the like) the heated water to the boiler. (Not shown.) Both of said openings in the present instance are in alinement with each other and also in alinement with the tube $d^4$ of the water-retarder $d$.

In connection with the before-named parts I may employ a filtering-chamber B in communication with the lower end of the water-chamber $b$ and separated therefrom by a perforated screen or plate $h$, said filtering-chamber being intended for the reception of charcoal or other filtering media and being provided with an inlet $i$ for the water; but this filter may be dipensed with, if desired.

The letter $j$ designates feet by which the device may be fastened to a bulkhead or other suitable support.

In practical operation the water is fed into the filter and then passes into the annular water-chamber $b$, its level being always maintained on a plane below the upper edge of the foraminous shell $c$, preferably as indicated by the dotted line $x$ in Fig. 1. Live steam enters the opening $f$ and is directed toward the water-retarder $d$ and commingles with the feed-water as the latter spurts through the openings in the foraminous shell $c$. The water and steam then passes into the retarder $d$ and trickles slowly down the corrugated inclined walls and out through the perforations $d^2$ and $d^3$, and the jets of water from said perforations are directed against the cylinder e and conveyed to the bottom and out through the opening g, the feed-water being thus thoroughly heated before passing finally to the boiler.

It will be understood that the water passing from the filtering-chamber B into the annular chamber b is cold and in passing upward reduces the temperature of the walls of the inner casing a, and this reduction of temperature tends to cool the liquid on the interior of said casing. In order to prevent this reduction of temperature from acting on the liquid after it has left the retarder, the cylinder e and insulator-space e' is provided, so that the water after leaving the retarder will be directed by the said cylinder to the discharge-opening g without permitting the latter to flow down the chilled walls of the casing a.

The heater is placed above the water-level of the boiler, either inside or outside the latter, so that the feed-water after being thoroughly heated will flow by gravity into the water-space of the boiler.

It will be understood that the invention may be employed for heating liquids other than water.

Having thus fully described my invention, what I claim as new, and desire to secure by Letters Patent, is—

1. In a feed-water device the combination of an outer shell; a casing within said outer shell; a foraminous cylindrical shell open at both ends and extending above the upper edge of said casing, and a retarder sustained within said inner casing below said foraminous shell.

2. In a feed-water device the combination of an outer shell provided with a water-inlet; a casing within said outer shell and provided in each end with an opening, and a perforated funnel-shape water-retarder interposed between the openings in the ends of said casing.

3. In a feed-water device the combination of an outer shell provided with steam and water inlets; a casing within said outer shell and provided near its upper end with a shoulder; a perforated shell supported by the shoulder of said casing, and a retarder in said casing below the perforations of said shell.

4. In a feed-water device the combination of an outer shell provided with steam and water inlets; a casing within said outer shell and provided with an outlet and a funnel-shape water-retarder interposed between the inlets of the outer shell and the outlet of the casing, said retarder being closed at one end by a central tube.

5. In a feed-water device the combination of an outer shell provided with water and steam inlets; a casing within said outer shell and having a bottom opening; a foraminous shell sustained by said inner shell, and a funnel-shape retarder sustained within said inner shell between the foraminous shell and the bottom opening of said inner shell.

6. In a device of the class described the combination of an outer shell provided with a steam-inlet; a casing within said shell; a retarder sustained by said casing, and a cylinder interposed between said casing and retarder for the purpose set forth.

7. In a device of the class described the combination of an outer shell; a casing within said shell and provided near its upper end with a shoulder; a chamber between said shell and casing; a perforated shell supported by the shoulder of said casing; a cylinder within said casing below said perforated shell; an insulating-space between said cylinder and casing, and a device within said cylinder and below said perforated shell for retarding the flow of liquid through said cylinder.

8. In a device of the class described the combination of an outer shell; a casing within said shell; a chamber between said shell and casing; a cylinder within said casing and a funnel-shape retarder sustained within said cylinder.

9. In a device of the class described the combination of an outer shell; a casing within said shell; a chamber between said shell and casing; a cylinder within said casing; an insulating-space between said cylinder and casing; and a perforated funnel-shape retarder suspended within said chamber whereby the cylinder will prevent the liquid from striking the wall of the casing as it is discharged from the perforations of said retarder.

10. In a device of the class described the combination of an outer shell having steam and liquid inlets; a casing within said shell; a chamber between said shell and casing; and a funnel-shape retarder sustained within said casing, said retarder having a tube which closes its smaller end whereby the steam may pass freely through the retarder while the liquid is held in check.

11. In a device of the class described the combination of an outer shell; a casing within said shell; a chamber between said shell and casing, and a retarder in said casing, said retarder having perforated corrugated sides.

In testimony whereof I affix my signature in the presence of two witnesses.

DAVID BRUCE CUMMING.

Witnesses:
CHARLES B. MANN, Jr.,
G. FERDINAND VOGT.